United States Patent [19]

Duff

[11] Patent Number: 5,500,886
[45] Date of Patent: Mar. 19, 1996

[54] X-RAY POSITION MEASURING AND CALIBRATION DEVICE

[75] Inventor: Eric A. Duff, San Diego, Calif.

[73] Assignee: ThermoSpectra, Franklin, Mass.

[21] Appl. No.: 224,634

[22] Filed: Apr. 6, 1994

[51] Int. Cl.⁶ .................................................. G01D 18/00
[52] U.S. Cl. ...................... 378/207; 378/58; 364/571.01
[58] Field of Search ................... 378/207, 58; 364/552, 364/571.01; 250/252.1; 356/237, 376; 382/8; 348/126

[56] References Cited

U.S. PATENT DOCUMENTS

| | | | |
|---|---|---|---|
| 3,564,133 | 2/1971 | Hobrough | 178/6.8 |
| 3,732,419 | 5/1973 | Kulberg et al. | 250/71.5 S |
| 3,732,420 | 5/1973 | Brunnett et al. | 250/71.5 |
| 3,745,345 | 7/1973 | Muehllehner | 250/71.55 |
| 3,852,598 | 12/1974 | Larsson | 250/327 |
| 3,882,304 | 5/1975 | Walters | 235/151.11 |
| 3,919,556 | 11/1975 | Berninger | 250/366 |
| 3,993,908 | 11/1976 | Kaplan et al. | 250/363 S |
| 4,055,765 | 10/1977 | Gerber et al. | 250/370 |
| 4,060,730 | 11/1977 | Zioni et al. | 250/369 |
| 4,066,903 | 1/1978 | LeMay | 250/363 S |
| 4,093,857 | 6/1978 | Lapidus | 250/369 |
| 4,212,061 | 7/1980 | Knoll et al. | 364/414 |
| 4,281,382 | 7/1981 | Knoll et al. | 364/414 |
| 4,386,404 | 5/1983 | Knoll et al. | 364/414 |

(List continued on next page.)

FOREIGN PATENT DOCUMENTS

| | | | |
|---|---|---|---|
| 1591807 | 6/1970 | France . | |
| 2325054 | 4/1977 | France | G01T 1/208 |
| 1370084 | 10/1974 | United Kingdom | G01J 1/20 |
| 1432870 | 4/1976 | United Kingdom | G01T 1/202 |
| 2014749 | 8/1979 | United Kingdom | G03H 1/00 |

OTHER PUBLICATIONS

"MV6000 Series In–Line Process Monitors–Product Description," published by IRT Corporation, Nov., 1993.
Brunsden et al., "A continuously variable line phantom for quality assurance," Medical Rad. Imaging, vol. I, 1977, IAEA, Vienna, AT, pp. 43–54.
Knoll et al., "Real–Time Correction of Radioisotope Camera Signals for Nonuniformity and Nonlinearity," Proceedings of 25th Annual Meeting, *Journal of Nuclear Medicine*, (1978) p. 746.
Stoub et al., "A Spatial Distortion Correction Method for Gamma Cameras," Proceedings of 26th Annual Meetings, *Journal of Nuclear Medicine*, (1979) p. 608.
Sorenson, "Improvements in Anger Camera Performance," *Journal of Nuclear Medicine*, vol. 21, No. 8 p. 801.02.

Primary Examiner—David P. Porta
Assistant Examiner—David Vernon Bruce
Attorney, Agent, or Firm—Willian Brinks Hofer Gilson & Lione

[57] ABSTRACT

A calibration system having a radiation source that generates the beam of radiation along the angular directions $\theta$, $\phi$. A first reference element which is separated from the radiation source by a distance of approximately $Z_1$ is then exposed to the beam of radiation. A second reference element is also present which is separated from the first reference element by a predetermined distance H and is exposed to the beam of radiation. An image detector produces images of the first and second reference elements, wherein the images are separated from each other by a distance R and angle $\phi$. The device further includes an angle measurement device that calculates $\theta$ from the values of $Z_1$ and H. A position measurement device having first and second sources of radiation that generate respective first and second beams of radiation directed at angles $\theta_1$, $\phi_1$, and $\theta_2$, $\phi_2$ respectively, toward an object of interest. An image detector is provided for producing 1) a first image of the object of interest formed by the first beam of radiation and 2) a second image of the object of interest formed by the second beam of radiation and that is separated from the first image by a distance L. A coordinate device then determines the coordinate of the object of interest from the values of $\theta_1$, $\theta_2$ and L.

66 Claims, 4 Drawing Sheets

U.S. PATENT DOCUMENTS

| | | | |
|---|---|---|---|
| 4,437,161 | 3/1984 | Anderson | 364/414 |
| 4,516,261 | 5/1985 | Harding et al. | 382/6 |
| 4,549,208 | 10/1985 | Kamejima et al. | 358/108 |
| 4,677,473 | 6/1987 | Okamoto et al. | 348/126 |
| 4,698,671 | 10/1987 | Garcia | 358/111 |
| 4,736,399 | 4/1988 | Okazaki | 378/99 |
| 4,809,308 | 2/1989 | Adams et al. | 378/98.2 |
| 4,852,131 | 7/1989 | Armistead | 378/4 |
| 4,926,452 | 5/1990 | Baker et al. | 378/22 |
| 5,020,086 | 5/1991 | Peugeot | 378/113 |
| 5,064,291 | 11/1991 | Reiser | 356/372 |
| 5,081,656 | 1/1992 | Baker et al. | 378/21 |
| 5,097,492 | 3/1992 | Baker et al. | 378/22 |
| 5,118,192 | 6/1992 | Chen et al. | 356/378 |
| 5,148,375 | 9/1992 | Horikami | 364/552 |
| 5,164,994 | 11/1992 | Bushroe | 382/8 |
| 5,245,671 | 9/1993 | Kobayashi et al. | 382/8 |
| 5,247,344 | 9/1993 | Doan | 356/394 |
| 5,291,535 | 3/1994 | Baker et al. | 378/22 |
| 5,351,278 | 9/1994 | Koshishiba et al. | 378/22 |
| 5,388,136 | 2/1995 | Halladay et al. | 378/58 |

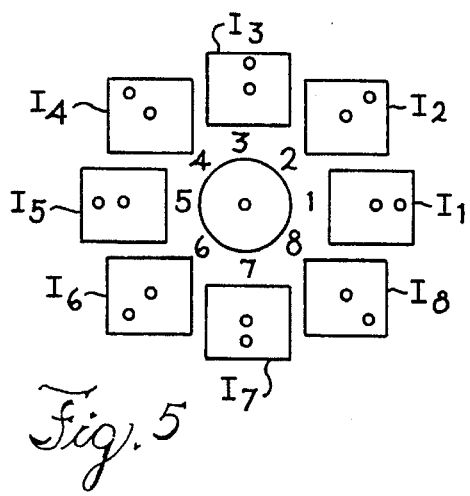
Fig. 5
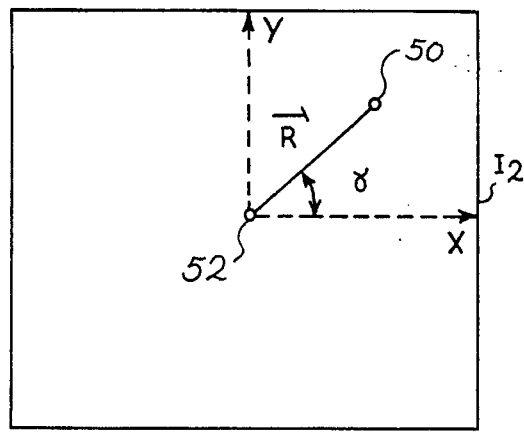
Fig. 6
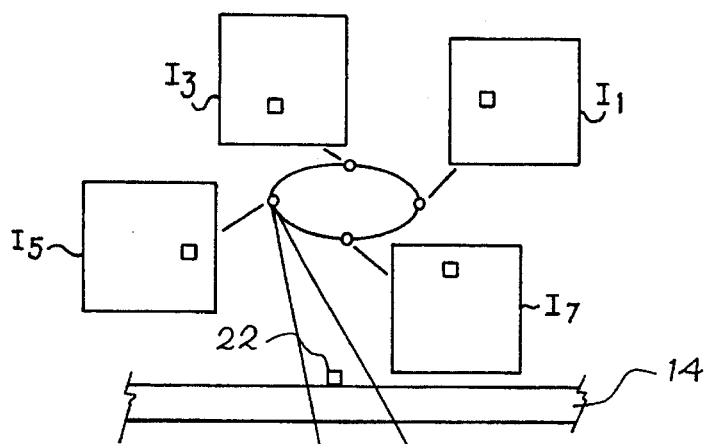
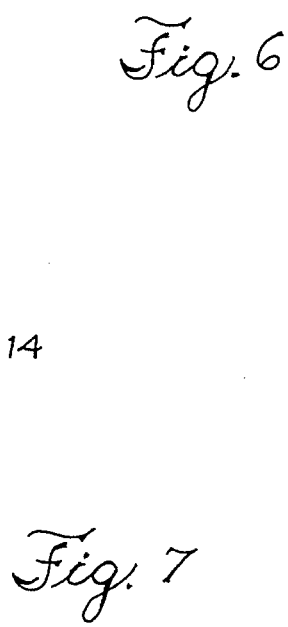
Fig. 7
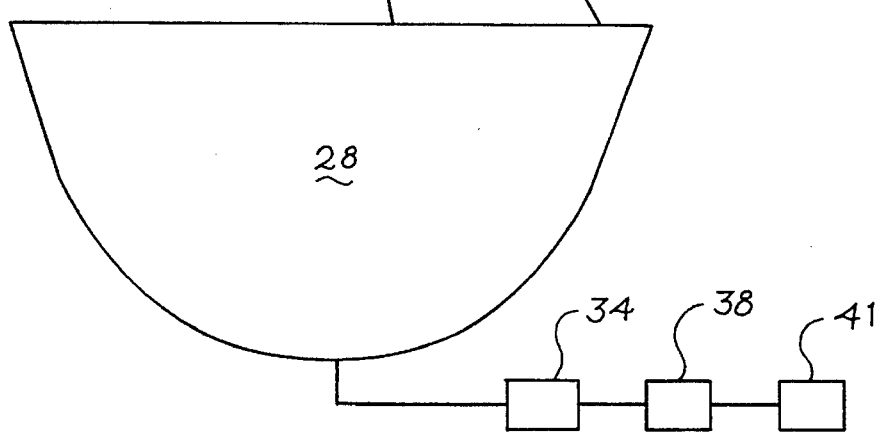

X-RAY POSITION MEASURING AND CALIBRATION DEVICE

BACKGROUND OF THE INVENTION

The present invention relates to x-ray imaging inspection systems and techniques. More specifically, the present invention relates to a novel method and apparatus for calibrating the angular direction of an x-ray beam. The present invention also relates to a novel method and apparatus for measuring a coordinate, such as the z-coordinate, of an object of interest that is imaged.

BRIEF DESCRIPTION OF THE DRAWINGS

FIG. 5 illustrates the images produced from the angular calibration system of FIG. 3;

FIG. 6 illustrates the angular relationship between two dots imaged in one of the images of FIG. 5;

FIG. 7 illustrates a measurement system for determining a coordinate of an object of interest according to the present invention;

SUMMARY OF THE INVENTION

Figure 1B:
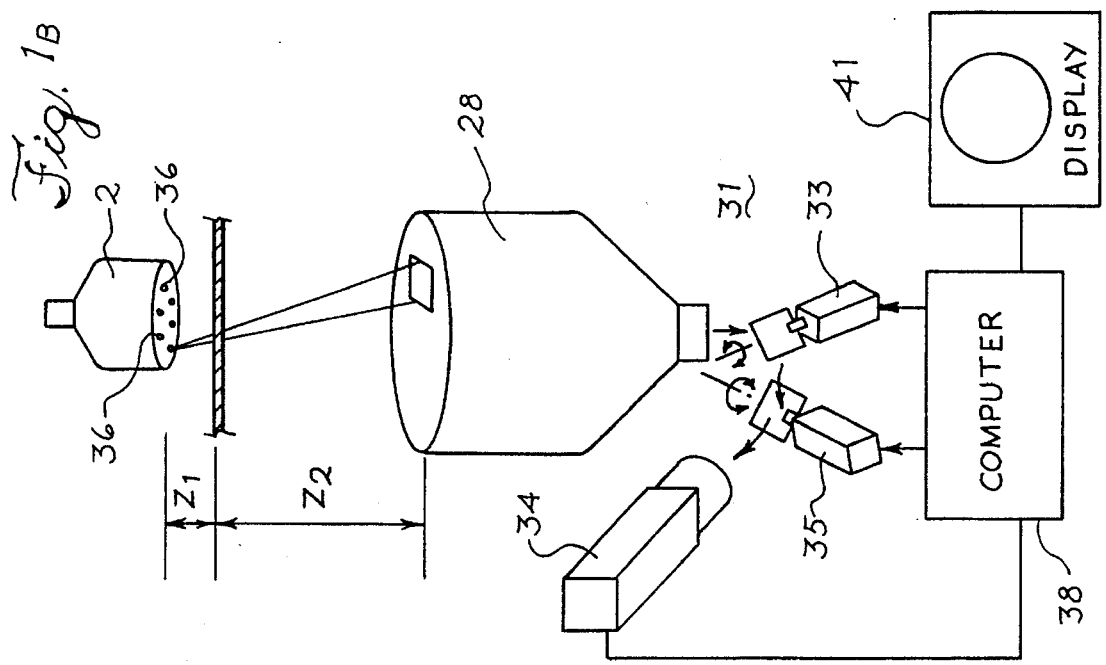
FIG. 1b is a schematic diagram of a second embodiment of an x-ray imaging system to be used in conjunction with the present invention.

One aspect of the present invention is a calibration system for determining the angular directions $\theta$ and $\phi$ of a beam of radiation generated by a radiation source. A first reference element which is separated from the radiation source by a distance of approximately $Z_1$ is then exposed to the beam of radiation. $Z_1$ is the distance from the radiation source to the object plane. A second reference element is also present which is separated from the first reference element by a predetermined distance H and is exposed to the beam of radiation. An image detector produces images of the first and second reference elements, wherein the images are separated from each other by a distance R and angle $\gamma$. The device further includes an angle measurement device that calculates $\theta$ from the values of H and $Z_1$.

Besides calibration, another aspect of the present invention is a position measurement device for measuring a coordinate of an object of interest. The measurement device has first and second sources of radiation that generate respective first and second beams of radiation directed at angles $\theta_1$, $\phi_1$ and $\theta_2$, $\phi_2$, respectively, toward the object of interest. An image detector is provided for producing 1) a first image of the object of interest formed by the first beam of radiation and 2) a second image of the object of interest formed by the second beam of radiation and that is separated from the first image by a distance L. A coordinate device then determines the coordinate of the object of interest from the values of $\theta_1$, $\theta_2$ and L.

The invention as described above provides the advantage of allowing one to accurately calibrate the angular direction of an x-ray beam striking an object to be imaged. Accurate calibration of the angular direction leads to improved processing of the image of the object.

The invention as described above provides the advantage of allowing one to accurately locate a coordinate of an object of interest to be imaged while at the same time taking an image of the object of interest. By simultaneously performing the imaging and measuring functions, time is saved in processing by eliminating a process step before the image is formed.

DETAILED DESCRIPTION OF AN EMBODIMENT OF THE INVENTION

The present invention is best understood upon viewing the embodiments illustrated in FIGS. 1–9, where like elements are denoted by like numerals. FIGS. 1a–b each show an x-ray source 2 that preferably incorporates a cathode 4 for producing an electron beam 6. The electron beam 6 is directed toward a grounded transmission anode target 8 that preferably is made of tungsten. It is understood that other configurations for x-ray source 2 are possible without falling outside the spirit of the invention, such as having anode 8 be a reflection-type target.

Cathode 4 has a current of approximately 0.1 ma and has a voltage ranging from −60 kV to −125 kV, preferably −125 kV, with respect to the anode target 8 so that electrons at energies of 125 keV strike the target anode 8. Source 2 preferably is a multi-focus x-ray source where the electron beam 6 emitted from cathode 4 is deflected to strike discrete and predetermined focal spot locations 36 on the anode target 8. Deflection of the electron beam 6 during operation is accomplished by magnetic coils 10 under local computer control. An example of such an x-ray source 2 is described in U.S. Pat. No. 5,020,086 whose contents are incorporated herein by reference.

The x-rays emitted from anode 6 pass through a window 12 made of an x-ray transparent material such as Beryllium or through an x-ray spectrum filter. X-ray spectrum filter 13 is chosen to modify the x-ray energy spectrum in such a way that it adjusts the sensitivity of the system to the component under inspection. In addition, an electrically actuated mechanical shutter (not shown) may be provided to cut off the emitted x-rays. Note that the shutter may be moved pneumatically in response to an electrical signal from a solenoid.

The x-rays generated by source 2 are directed toward an object to be imaged. Though the choice of object to be imaged is arbitrary, for the present invention the object preferably comprises an electronic assembly or a circuit board 14 including electronic components electrically connected to the circuit board through solder joints. The present invention allows one to identify defects in circuit boards such as disclosed in U.S. Pat. No. 4,809,308 whose entire contents are enclosed herein by reference.

Figure 2:
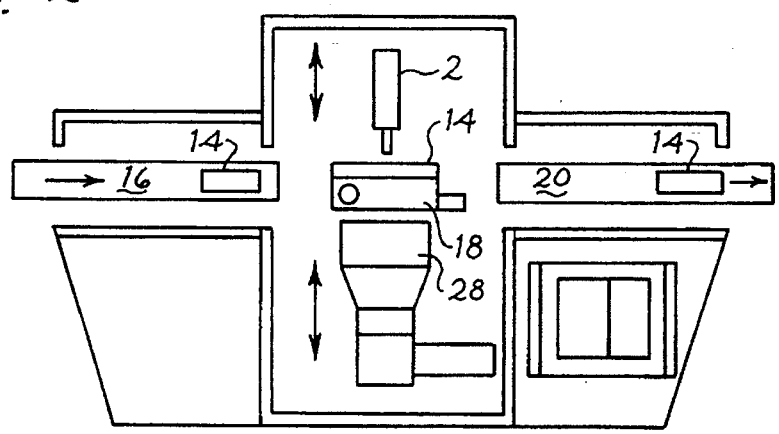
FIG. 2 is a cross-sectional view of an object handling device to be used in conjunction with the x-ray imaging systems of FIGS. 1a–b.

As schematically shown in FIG. 2, an inlet conveyor 16 transports a board 14 from an outside factory conveyor to an X-Y table 18. Once the X-Y table 18 has received a new board 14, the x-ray imaging inspection cycle can begin while the outlet conveyor 20 returns an inspected board to the factory.

When a circuit board 14 is mounted on the X-Y table 18 the board is translationally moved along the x and y directions so that an object of interest, such as a solder joint 22, can be imaged. Once the board 14 is properly positioned, a beam of radiation, such as x-ray beam 24, is projected toward the solder joint 22 on circuit board 14. A portion of the x-ray beam 24 transmits through and is modulated by the circuit board 14 where it impacts upon an image detector capable of imaging x-rays, such as a fluorescent or scintillating screen 26 of an image intensifier 28 which is positioned in-line with the x-ray beam 24.

The x-rays impacting upon the fluorescent or scintillating screen 26 are converted into a visible light image. If the image detector consists of an image intensifier, the optical image is amplified in brightness. The visible light image of the x-ray shadow image created by the transmission of the x-ray beam 24 through the circuit board 14 is redirected off-axis by an optical system, such as a flat planar aluminized front surface mirror 30 mounted at an angle 45 degrees to the horizontal, as shown in FIG. 1a. In the embodiment of FIG. 1a, the x-ray shadow image appearing after amplification by the image intensifier 28 is reflected at a 90 degree angle through lens 32 and into video camera 34, such as a CCD camera. The use of mirror 30 in the system would allow the camera 34 to remain outside of the x-ray beam 24 if a non-x-ray-opaque image detector were used.

Figure 1A:
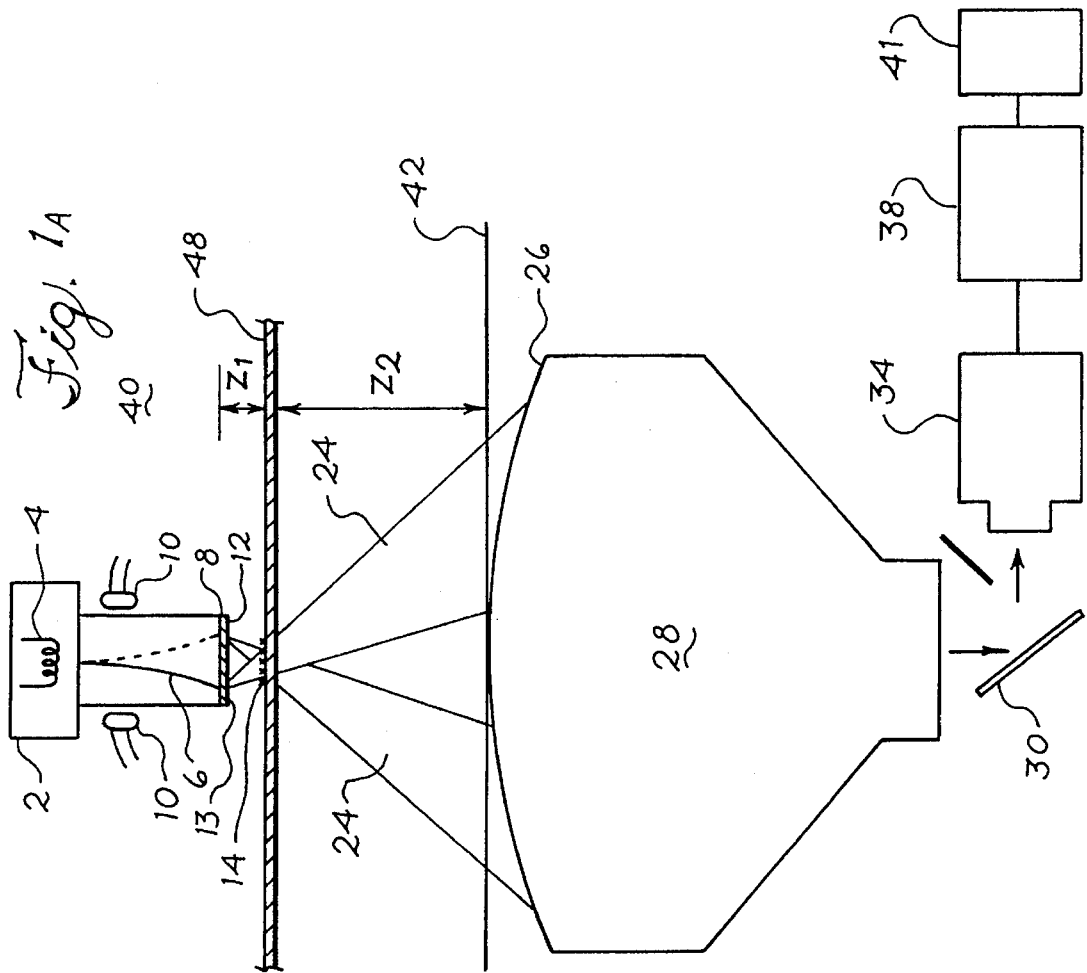
FIG. 1a is a schematic diagram of an embodiment of an x-ray imaging system to be used in conjunction with the present invention.

In the embodiment of FIG. 1b, the optical system comprises a computer-controlled "view selector" 31 to maximize the resolution of the system. During image collection, the view selector 31 is synchronized with the movement of the x-ray focal spot 36 to provide a selected portion of the visible image from the screen 26 to the camera 34. By viewing only the selected portion of the entire image intensifier surface, the digital resolution of the individual images is maximized. The view selector 31 preferably contains two independently rotatable mirrors 33, 35, the first mirror 33 being rotatable so as to vary the location of the selected portion of the image intensifier surface along the x-axis. The second mirror 35 is rotatable so as to vary the location of the selected portion of the surface along the y-axis. The mirrors 33, 35 may be controlled by computer 38 so that the image reflected from the mirrors is received by camera 34.

Figure 3:
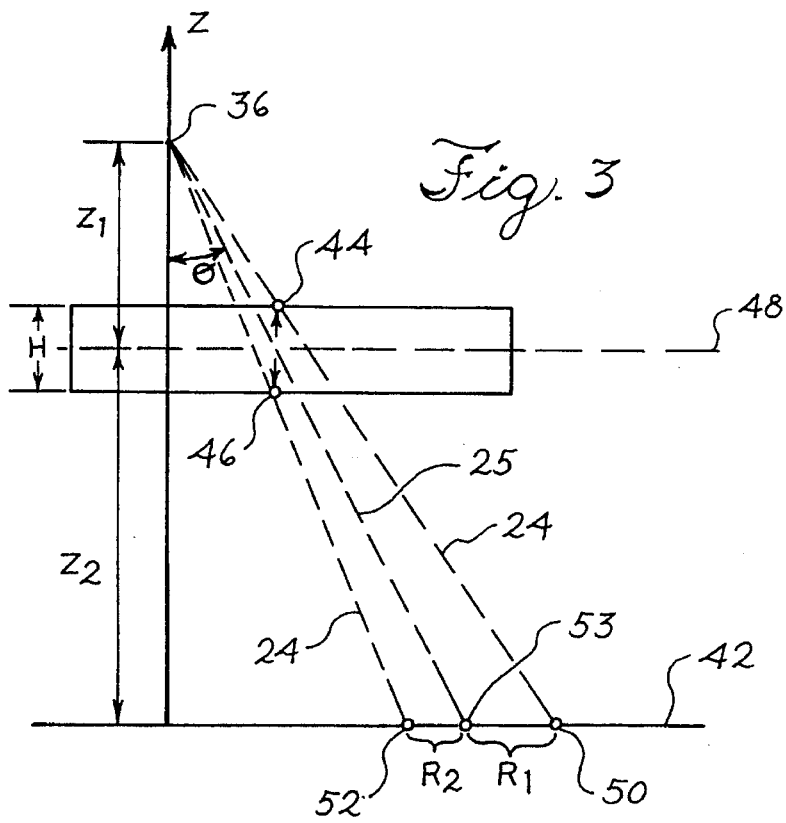
FIG. 3 is a schematic diagram of an embodiment of an angular calibration system according to the present invention.

The image intensifier 28 used in the embodiments of FIGS. 1a–b and 3, preferably is a large format unit or multiple small format units positioned to receive the emitted x-rays which converts the x-rays to visible light for viewing by camera 34. The large format image intensifier face plate captures individual images which are subsequently digitized by the image processor 38. The use of an image intensifier in the imaging chain has the distinct advantage of high conversion efficiency resulting in improved signal to noise over passive screen-based conversion systems. This feature permits optimizing the field-of-view, resolution, and throughput for virtually any board type, even if the board has a wide variation of component pitch present. The use of a large format imaging system eliminates the need to have a spinning detector, reducing the mechanical complexity of the system and improving system reliability and the repeatability of results. This approach simplifies the mechanical requirements for the image collection system and allows static rather than dynamic image train alignment/calibration.

During a board inspection cycle, images are projected toward the outer circumference of the image intensifier 28 by moving the electron beam 6 to a set of predefined focal spot locations 36 on target anode 8. Once the electron beam 6 strikes anode 8 at a focal spot location 36, an x-ray beam 24 is emitted toward object 14. For a given focal spot location 36, the emitted x-ray beam 24 will be directed toward the object at a given inclination angle θ with respect to the z-axis and a given azimuthal angle φ.

The x-ray source 2 and the image intensifier 28 are mounted on independent vertical drive mechanisms allowing continuously variable fields-of-view ranging from approximately 0.1" to approximately 1.0". In particular, the x-ray source is mounted on a programmable Z-axis ($Z_1$) which changes the distance from the anode 8 to both the object plane 48 and the object of interest 22. The image intensifier 28 also is mounted on a programmable Z-axis ($Z_2$) which changes the distance from both the object plane 48 and object of interest 22 to the scintillation screen 26. Variation of the field-of-view is accomplished by varying the $Z_1$ and $Z_2$ distances and the distance between the board 14 and the image intensifier 28, where $Z_1$ and $Z_2$ are the distances from object plane 48 to the x-ray source 2 and image intensifier 28, respectively.

The analog output of video camera 34 is provided to image processing/defect recognition system 38 which processes the image information to formulate an image on a display, such as a video monitor 41. One function performed by image processing system 38 is to calibrate the imaging system prior to imaging an object of interest, such as solder joint 22. In particular, the present invention involves an angular calibration system 40 for determining the angular direction of an x-ray beam. It should be noted that the angular calibration system is applicable for use with other types of beams of radiation as well.

Figure 4:
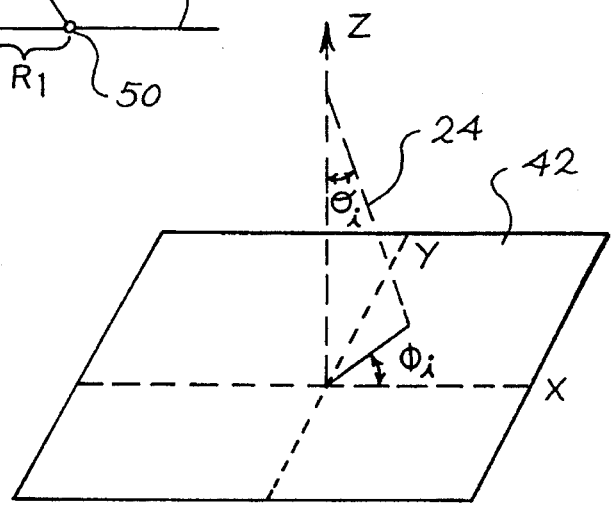
FIG. 4 is a diagram defining the angular values of an x-ray beam emitted from the x-ray imaging systems of FIGS. 1a–b.

The angular calibration system 40 according to the present invention utilizes the x-ray imaging systems described previously and shown in FIGS. 1a–b. FIG. 3 illustrates the calibration system 40 in greater detail. A radiation source, such as x-ray source 2, is located along a first direction, such as the z-axis. The radiation source 2 generates a beam of radiation, such as x-ray beam 24, along an inclinational angular direction θ measured with respect to the z-axis. Furthermore, as viewed along the z-axis, the x-ray beam 24 strikes an image plane 42 at an azimuthal angle φ with respect to the x-axis as shown in FIG. 4. It should be noted from herebefore and hereafter the angles θ and φ are measured with respect to beam axis 25. However, other reference directions are possible without falling outside the scope of the present invention.

Accurate measurement of the angles θ and φ is important when one reconstructs a tomographic image of an object from a plurality of images formed from x-ray beams 24 emanating from different directions. Measurement of the angular direction of the x-ray beam 24 is accomplished by placing two reference elements 44, 46 near the object plane 48. The reference elements 44, 46 preferably are made of an x-ray absorbent material, such as lead, and are spherical in shape so that any distortion in their image is equal in all directions. The reference elements 44, 46 may be present on a circuit board 14 to be imaged or positioned within a block of x-ray transparent material, such as plastic. The two reference elements 44, 46 are positioned at the same x and y coordinates but are separated from each other along the z-direction by a predetermined distance H, such as 40 mils.

It is understood that other calibration systems are possible without departing from the spirit of the present invention. For example, the reference elements 44 and 46 may be positioned at different x and y coordinates. However, the calculations involved are more complicated than when the elements 44 and 46 are aligned along the z-direction. In another embodiment, a single reference element 44 is moved to two Z-axis calibration positions separated by distance H by a movement device, such as moving the x-ray source 2 and image intensifier 28 both by a distance H so that the sum $Z_1+Z_2$ is unchanged. An image is taken at each calibration position. The two images are overlaid resulting in an image that corresponds to the image of two reference elements 44, 46 located at the two calibration Z-axis positions.

In each of the embodiments described above, the reference elements are positioned by the X-Y table 18 so that they are located under the center of the anode 8 and are located near the object plane 48. Besides H, the distance $Z_1$ between the x-ray source and object plane 48 and the distance $Z_2$ between the object plane 48 and the image detector, such as image intensifier 28, are also known.

Once the reference elements 44, 46 are properly positioned, a first x-ray beam 24 is emitted by the x-ray source 2 so that a first image of both reference elements 44, 46 is generated. The first x-ray beam 24 is emitted along a direction that is to be used for forming an image of an object of interest. As shown in FIG. 5, multiple images $I_i$ (i=1, 2 . . . 8) of the reference elements are taken along those directions corresponding to the beam directions for imaging the object of interest. Note that an image taken along the Z-axis, θ=0, may be taken as well.

As seen by the enlarged view of $I_2$ shown in FIG. 6, each image of the reference elements 44, 46 comprises two dots 50, 52, respectively. The separation vector $\vec{R}$ between the two dots 50, 52 changes in magnitude, R and direction γ depending on the image selected. R and γ can be measured manually or by a microprocessor, wherein γ corresponds to the angle φ of the x-ray beam 24. The microprocessor then can calculate the inclination angle θ based on the values of R and H by use of the equation:

$$\theta_i = \tan^{-1}[(R_{i1} - R_{i2})/H - (R_{i1} + R_{i2})/Z_1],$$

where $R_{i1}$ and $R_{i2}$ are the signed displacements of the dots 50, 52 measured from a point 53 where beam axis 25 intersects the ith digitized image. They are measured in units of distance in the imaging plane 42. Note that if one reference element lies exactly along beam axis 25 then $R_{i2}=0$ and $R_{i1}$ is equal to the distance, R, between the two images and $\theta_i = \tan^{-1}[R/H - R/Z_1]$.

Thus, the angles θ and φ are determined for each of the imaging positions for the x-ray source. With this information one can produce an improved three-dimensional density reconstruction of an object of interest when images are taken from two or more of the imaging positions. For example, with the values of θ and φ known one can accurately determine a particular coordinate, such as Z, for a particular object of interest, such as a solder joint 22, from two or more images of the solder joint taken at the predetermined beam directions. Determining the value of Z is important for x-ray imaging techniques which analyze density distributions at particular positions along the direction between the source and imaging device, since the value of Z is often required for any particular reconstruction. In the past, before an x-ray image was formed the value of Z for a solder joint 22 on a circuit board 14 would be determined from a topographical map formed via a laser range finder. The present invention allows one to simultaneously determine Z while x-ray images of the solder joint 22 are taken. This results in improved processing times.

Figure 8:
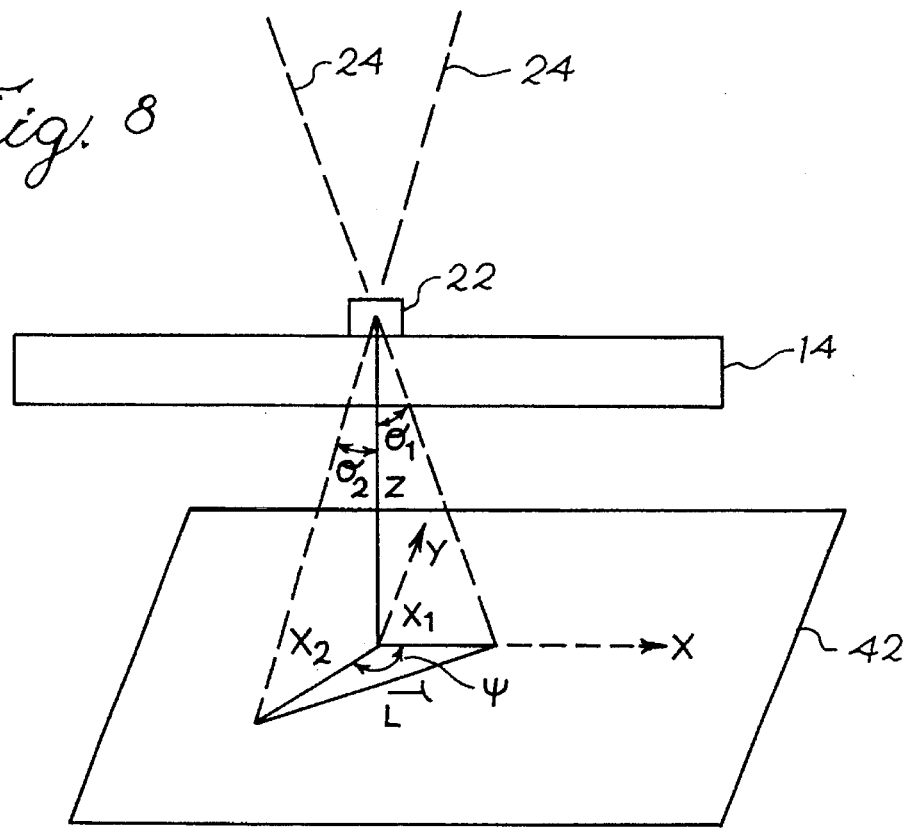
FIG. 8 illustrates the image produced from two radiation beams emitted from the measurement system of FIG. 7.
Figure 9:
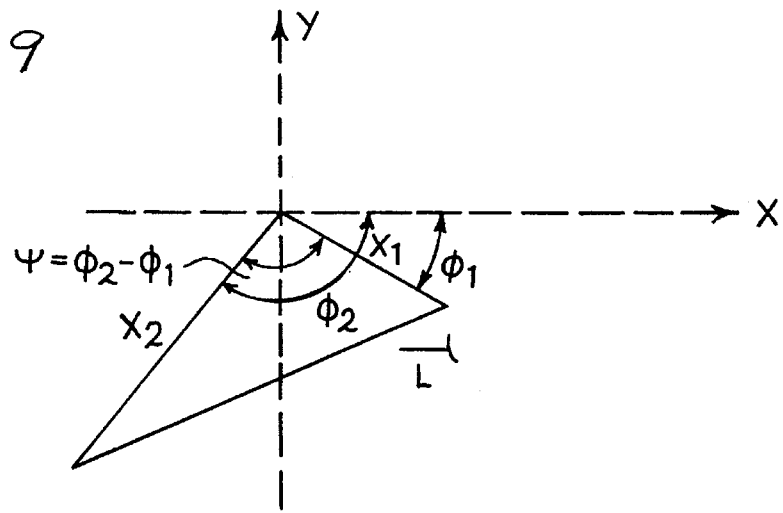
FIG. 9 is an enlarged view of the image plane of FIG. 8.

The determination of Z is best shown in FIGS. 7–9 where the image of a solder joint on a circuit board is taken from two or more predetermined x-ray imaging directions. A first source of radiation, such as x-ray source 2, generates a first beam of radiation, such as x-ray beam 24, directed at angles $\theta_1, \phi_1$ toward the solder joint 22. Next, a second source of radiation, such as x-ray source 2, generates a second beam of radiation, such as x-ray beam 24, directed at angles $\theta_2, \phi_2$ toward the solder joint 22 as well. The x-rays modulated by the solder joint 22 are directed to an image detector, such as image intensifier 28, for producing 1) a first image ($I_1$) of the solder joint formed by the first beam of x-rays and 2) a second image ($I_2$) of the solder joint formed by the second beam of x-rays. As shown in FIGS. 8 and 9, when the two images of the solder joint 22 are overlapped, they are separated from each other by a length L. A microprocessor then determines the pixel positions of the two images of the solder joint 22 and then determines the separation distance L in a well-known manner and determines Z from the values of $\theta_1, \theta_2, \phi_1, \phi_2$ as follows:

$$Z = L/(\tan^2 \theta_1' + \tan^2 \theta_2' - 2 \tan \theta_1' \tan \theta_2' \cos(\phi_2' - \phi_1'))^{1/2}$$

The primes have been added to the angle variables to account for parallax effects. θ and φ are known for the beam axis 25 corresponding to each image. For an image $I_i$ (i=1,2) off center and located at x,y coordinates, $X_i$ and $Y_i$ measured with respect to a point where beam axis 25 intersects the ith image.

$$\tan \theta_i' = [(X_i + Z_1 \tan \theta_i \cos \phi_i)^2 + (Y_i + Z_1 \tan \theta_i \sin \phi_i)^2]^{1/2}/Z_1$$

and $$\phi_i' = \tan^{-1}[(X_i + Z_1 \tan \theta_i \cos \phi_i)/(Y_i + Z_1 \tan \theta_i \sin \phi_i)]$$

$Z_1$ is the distance from x-ray source 2 to object plane 48 and the inverse tangent operation selects the proper value from a full 360° range.

While the invention has been described with relation to certain presently preferred embodiments, it is understood that the invention as expressed in the claims is not limited to those described preferred embodiments. For example, the present invention can be used in conjunction with an image reconstruction system such as disclosed in an application filed concurrently with this application having the title "Electrical Connection Imaging" by Steven W. Smith (attorney docket no. 5707/8) whose entire contents are incorporated herein by reference. Those with skill in this art will recognize other modifications of the invention which will still fall within the scope of the invention, as expressed in the accompanying claims.

I claim:

1. A calibration system for determining the angular directions θ, φ of a beam of radiation, said system comprising:

a radiation source generating said beam of radiation at said angular direction θ measured with respect to a first direction;

a first reference element exposed to said beam of radiation and separated from said radiation source by a distance of approximately $Z_1$;

a second reference element exposed to said beam of radiation and separated from said first reference element by a predetermined distance H;

an image detector producing a first image of said first reference element and a second image of said second reference element; and an angle measurement device calculating said angle θ from said distances H and $Z_1$.

2. The calibration system of claim 1, wherein said radiation source comprises an x-ray source and said radiation beam comprises an x-ray beam.

3. The calibration system of claim 1, wherein said first reference element is spherical.

4. The calibration system of claim 1, wherein said first reference element comprises lead.

5. The calibration system of claim 3, wherein said first reference element comprises lead.

6. The calibration system of claim 3, wherein said second reference element is spherical.

7. The calibration system of claim 6, wherein said second reference element comprises lead.

8. The calibration system of claim 1, wherein said angle measurement device calculates $\phi$ from said first and second images.

9. The calibration system of claim 2, wherein said angle measurement device calculates $\phi$ from said first and second images.

10. The calibration system of claim 2, wherein said x-ray source comprises a multi-focus x-ray source.

11. The calibration system of claim 1, wherein said image detector comprises an image intensifier.

12. The calibration system of claim 2, wherein said image detector comprises an image intensifier.

13. The calibration system of claim 1, wherein said angle measurement device comprises a microprocessor to calculate $\theta$ from the values of $Z_1$ and H.

14. The calibration system of claim 2, wherein said angle measurement device comprises a microprocessor to calculate $\theta$ from the values of $Z_1$ and H.

15. The calibration system of claim 13, wherein said microprocessor calculates $\theta$ according to the equation:

$$\theta = \tan^{-1}[(R_1 - R_2)/H - (R_1 + R_2)/Z_1],$$

where $R_1$ and $R_2$ are the signed displacements of the first and second images measured from a point at which said beam of radiation intercepts said image detector.

16. The calibration system of claim 14, wherein said microprocessor calculates $\theta$ according to the equation:

$$\theta = \tan^{-1}[(R_1 - R_2)/H - (R_1 + R_2)/Z_1],$$

where $R_1$ and $R_2$ are the signed displacements of the first and second images measured from a point at which said beam of radiation intercepts said image detector.

17. A method of calibration for determining the angular directions $\theta$, $\phi$ of a beam of radiation from a radiation source, said method comprising the steps of:

generating said beam of radiation at said angular direction $\theta$ measured with respect to a first direction;

positioning a reference element at a first position which is a distance of approximately $Z_1$ from said radiation source;

exposing said reference element at said first position to said beam of radiation;

positioning a reference element at a second position which is a predetermined distance H from said first position;

exposing said reference element at said second position to said beam of radiation;

producing a first image of said reference element at said first position and a second image of said reference element at said second position; and calculating said angle $\theta$ from said distances H and $Z_1$.

18. The calibration method of claim 17, wherein said radiation source comprises an x-ray source and said radiation beam comprises an x-ray beam.

19. The calibration method of claim 17, wherein $\theta$ is calculated according to the equation:

$$\theta = \tan^{-1}[(R_1 - R_2)/H - (R_1 + R_2)/Z_1],$$

where $R_1$ and $R_2$ are the signed displacements of said first and second images measured from a point at which said beam of radiation intercepts said image detector.

20. The calibration method of claim 18, wherein $\theta$ is calculated according to the equation:

$$\theta = \tan^{-1}[(R_1 - R_2)/H - (R_1 + R_2)/Z_1],$$

where $R_1$ and $R_2$ are the signed displacements of said first and second images measured from a point at which said beam of radiation intercepts said image detector.

21. The calibration method of claim 17, comprising the step of calculating $\phi$ from said first and second images.

22. The calibration method of claim 18, comprising the step of calculating $\phi$ from said first and second images.

23. A position measurement device for measuring a coordinate of an object of interest, said device comprising:

a first source of radiation generating a first beam of radiation directed at angles $\theta_1$, $\phi_1$ towards said object of interest;

a second source of radiation generating a second beam of radiation directed at an angle $\theta_2$, $\phi_2$ towards said object of interest;

an image detector for producing 1) a first image of said object of interest formed by said first beam of radiation and 2) a second image of said object of interest formed by said second beam of radiation and that is separated from said first image by a distance L; and a coordinate device for determining said coordinate of said object of interest from the values of $\theta_1$, $\theta_2$ and L.

24. The position measurement device of claim 23, wherein said first source of radiation is a first x-ray source and said first beam of radiation is a first x-ray beam.

25. The position measurement device of claim 24, wherein said second source of radiation is a second x-ray source and said second beam of radiation is a second x-ray beam.

26. The position measurement device of claim 23, wherein said object of interest is a solder joint.

27. The position measurement device of claim 25, wherein said object of interest is a solder joint.

28. The position measurement device of claim 25, wherein said x-ray source comprises a multi-focus x-ray source.

29. The position measurement device of claim 23, wherein said image detector comprises an image intensifier.

30. The position measurement device of claim 23, wherein said coordinate device comprises a microprocessor to calculate said coordinate from the values of $\theta_1$, $\theta_2$ and L.

31. The position measurement device of claim 25, wherein said coordinate device comprises a microprocessor to calculate said coordinate from the values of $\theta_1$, $\theta_2$ and L.

32. The position measurement device of claim 31, wherein said coordinate is the Z-coordinate measured along a z-axis and wherein $\theta_1$ and $\theta_2$ are measured with respect to said z-axis.

33. The position measurement device of claim 32, wherein said microprocessor calculates Z according to the equation:

$$Z = L/(\tan^2 \theta_1' + \tan^2 \theta_2' - 2\tan \theta_1' \tan \theta_2' \cos(\phi_2' - \phi_1'))^{1/2},$$

wherein primes indicate the angle variables have been corrected for parallax effects.

34. A method of measuring a coordinate of an object of interest, said method comprising the steps of:

generating a first beam of radiation directed at angles $\theta_1$, $\phi_1$ toward said object of interest;

generating a second beam of radiation directed at an angle $\theta_2$, $\phi_2$ toward said object of interest;

producing a first image of said object of interest formed by said first beam of radiation;

producing a second image of said object of interest formed by said second beam of radiation and that is separated from said first image by a distance L; and determining said coordinate of said object of interest from the values of $\theta_1$, $\theta_2$ and L.

35. The method of measuring position of claim 34, wherein said first beam of radiation is a first x-ray beam.

36. The method of measuring position of claim 35, wherein said second beam of radiation is a second x-ray beam.

37. The method of measuring position of claim 34, wherein said object of interest is a solder joint.

38. The method of measuring position of claim 36, wherein said object of interest is a solder joint.

39. The method of measuring position of claim 34, wherein said coordinate is the Z-coordinate measured along a z-axis and wherein $\theta_1$ and $\theta_2$ are measured with respect to said z-axis.

40. The method of measuring position of claim 39, wherein said microprocessor calculates Z according to the equation:

$$Z = L/(\tan^2\theta_1' + \tan^2\theta_2' - 2\tan\theta_1'\tan\theta_2'\cos(\phi_2' - \phi_1'))^{1/2},$$

wherein primes indicate the angle variables have been corrected for parallax effects.

41. A position measurement system for measuring a coordinate of an object of interest, said system comprising:

a first source of radiation generating a first beam of radiation at unknown angles $\theta_1$ and $\phi_1$;

a second source of radiation generating a second beam of radiation at unknown angles $\theta_2$ and $\phi_2$;

a placement device that positions either a calibration element having a first reference element and a second reference element separated from said first reference element by a predetermined distance H or an object of interest so that said first and second beams of radiation irradiate either said reference object or said object of interest;

an image detector for imaging either said reference object or said object of interest when irradiated by said first and second beams of radiation wherein:

1) when said calibration element is irradiated by said first beam of radiation said image detector produces a first image of said first reference element and a second image of said second reference element displaced from a point at which said first beam of radiation intercepts said image detector by $R_{11}$ and $R_{12}$, respectively; and when said calibration element is irradiated by said second beam of radiation said image detector produces a first image of said first reference element and a second image of said second reference element displaced from a point at which said second beam of radiation intercepts said image detector by $R_{21}$ and $R_{22}$, respectively; and 2) when said object of interest is irradiated by said first and second beams of radiation a first image of said object of interest formed by said first beam of radiation and second image of said object of interest is formed by said second beam of radiation that is separated from said first image by a distance L;

an angle measurement device calculating $\theta_1$ from said distances $R_{11}$, $R_{12}$ and H and calculating $\theta_2$ from said distances $R_{21}$, $R_{22}$, and H;

a coordinate device for determining said coordinate from the calculated values of $\theta_1$, $\theta_2$ and L.

42. The position measurement system of claim 41, wherein said first radiation source comprises a first x-ray source and said first radiation beam comprises a first x-ray beam.

43. The position measurement system of claim 42, wherein said second radiation source comprises a second x-ray source and said second radiation beam comprises a second x-ray beam.

44. The position measurement system of claim 41, wherein said image detector comprises an image intensifier.

45. The position measurement system of claim 43, wherein said image detector comprises an image intensifier.

46. The position measurement system of claim 41 wherein said angle measurement device comprises a microprocessor that calculates $\theta_1$ and $\theta_2$ according to the equation:

$$\theta_i = \tan^{-1}[(R_{i1} - R_{i2})/H - (R_{i1} + R_{i2})Z_i],$$

where i=image number=1,2.

47. The position measurement system of claim 43 wherein said angle measurement device comprises a microprocessor that calculates $\theta_1$ and $\theta_2$ according to the equation:

$$\theta_i = \tan^{-1}[(R_{i1} - R_{i2})/H - (R_{i1} + R_{i2})Z_i],$$

where i=image number=1,2.

48. The position measurement system of claim 41 wherein said coordinate is the Z-coordinate measured along a Z-axis and wherein $\theta_1$ and $\theta_2$ are measured with respect to said z-axis.

49. The position measurement system of claim 43 wherein said coordinate is the Z-coordinate measured along a Z-axis and wherein $\theta_1$ and $\theta_2$ are measured with respect to said z-axis.

50. The position measurement system of claim 46 wherein said coordinate is the Z-coordinate measured along a Z-axis and wherein $\theta_1$ and $\theta_2$ are measured with respect to said z-axis.

51. The position measurement system of claim 48 wherein said coordinate device comprises a microprocessor that calculates Z according to the equation:

$$Z = L/(\tan^2\theta_1' + \tan^2\theta_2' - 2\tan\theta_1'\tan\theta_2'\cos(\phi_2' - \phi_1'))^{1/2},$$

wherein primes indicate the angle variables have been corrected for parallax effects.

52. The position measurement system of claim 49 wherein said coordinate device comprises a microprocessor that calculates Z according to the equation:

$$Z = L/(\tan^2\theta_1' + \tan^2\theta_2' - 2\tan\theta_1'\tan\theta_2'\cos(\phi_2' - \phi_1'))^{1/2},$$

wherein primes indicate the angle variables have been corrected for parallax effects.

53. The position measurement system of claim 50 wherein said coordinate device comprises a microprocessor that calculates Z according to the equation:

$$Z = L/(\tan^2\theta_1' + \tan^2\theta_2' - 2\tan\theta_1'\tan\theta_2'\cos(\phi_2' - \phi_1'))^{1/2},$$

wherein primes indicate the angle variables have been corrected for parallax effects.

54. A calibration system for determining the angular directions $\theta$, $\phi$ of a beam of radiation, said system comprising:

a radiation source generating said beam of radiation at said angular direction θ measured with respect to a first direction;

a reference element at a first position which is exposed to said beam of radiation and separated from said radiation source by a distance of approximately $Z_1$;

a movement device for moving said reference element to a second position which is separated from said first position by a predetermined distance H, wherein said reference element at said second position is exposed to said beam of radiation;

an image detector producing a first image of said reference element at said first position and a second image of said reference element at said second position; and an angle measurement device calculating said angle θ from said distances H and $Z_1$.

55. The calibration system of claim 54, wherein said radiation source comprises an x-ray source and said radiation beam comprises an x-ray beam.

56. The calibration system of claim 54, wherein said reference element is spherical.

57. The calibration system of claim 54, wherein said reference element comprises lead.

58. The calibration system of claim 55, wherein said x-ray source comprises a multi-focus x-ray source.

59. The calibration system of claim 54, wherein said image detector comprises an image intensifier.

60. The calibration system of claim 55, wherein said image detector comprises an image intensifier.

61. The calibration system of claim 54, wherein said angle measurement device comprises a microprocessor to calculate θ from the values of $Z_1$ and H.

62. The calibration system of claim 55, wherein said angle measurement device comprises a microprocessor to calculate θ from the values of $Z_1$ and H.

63. The calibration system of claim 61, wherein said microprocessor calculates θ according to the equation:

$$\theta = \tan^{-1}[(R_1 - R_2)/H - (R_1 + R_2)Z_1],$$

where $R_1$ and $R_2$ are the signed displacements of the first and second images measured from a point at which said beam of radiation intercepts said image detector.

64. The calibration system of claim 62, wherein said microprocessor calculates θ according to the equation:

$$\theta = \tan^{-1}[(R_1 - R_2)/H - (R_1 + R_2)Z_1],$$

where $R_1$ and $R_2$ are the signed displacements of the first and second images measured from a point at which said beam of radiation intercepts said image detector.

65. The calibration system of claim 54, wherein said angle measurement device calculates φ from said first and second images.

66. The calibration system of claim 55, wherein said angle measurement device calculates φ from said first and second images.

* * * * *